US011836195B2

(12) United States Patent
Kim et al.

(10) Patent No.: US 11,836,195 B2
(45) Date of Patent: Dec. 5, 2023

(54) SYSTEM FOR SELECTIVELY IMPORTING WEB DATA BY ARBITRARILY SETTING ACTION DESIGN

(71) Applicant: HAENASOFT COMPANY, LIMITED, Siheung-si (KR)

(72) Inventors: Jong Pil Kim, Seoul (KR); Beom Soo Kim, Seoul (KR); Ji Won Hong, Ansan-si (KR); Sung Rang Kong, Siheung-si (KR)

(73) Assignee: HAENASOFT COMPANY, LIMITED, Siheung-si (KR)

( * ) Notice: Subject to any disclaimer, the term of this patent is extended or adjusted under 35 U.S.C. 154(b) by 0 days.

(21) Appl. No.: 17/311,339

(22) PCT Filed: Mar. 10, 2020

(86) PCT No.: PCT/KR2020/003336
§ 371 (c)(1),
(2) Date: Jun. 6, 2021

(87) PCT Pub. No.: WO2021/182657
PCT Pub. Date: Sep. 16, 2021

(65) Prior Publication Data
US 2022/0414163 A1  Dec. 29, 2022

(51) Int. Cl.
*G06F 16/00* (2019.01)
*G06F 16/951* (2019.01)
*G06F 16/955* (2019.01)

(52) U.S. Cl.
CPC .......... *G06F 16/951* (2019.01); *G06F 16/955* (2019.01)

(58) Field of Classification Search
CPC ............................ G06F 16/951; G06F 16/955
See application file for complete search history.

(56) References Cited

U.S. PATENT DOCUMENTS

| 11,423,018 | B1 * | 8/2022 | Paiz | G06F 16/243 |
|---|---|---|---|---|
| 2004/0215551 | A1 * | 10/2004 | Eder | G06Q 40/00 |
| | | | | 705/38 |
| 2007/0208828 | A1 * | 9/2007 | Brier | G06F 16/951 |
| | | | | 709/219 |
| 2011/0314142 | A1 * | 12/2011 | Newton | G06F 16/951 |
| | | | | 709/224 |
| 2012/0078875 | A1 * | 3/2012 | Price | G06F 16/9535 |
| | | | | 707/E17.108 |
| 2016/0170814 | A1 * | 6/2016 | Li | G06F 9/542 |
| | | | | 719/318 |

(Continued)

FOREIGN PATENT DOCUMENTS

| CN | 102184227 A | * | 9/2011 |
|---|---|---|---|
| CN | 105279272 A | * | 1/2016 |

(Continued)

*Primary Examiner* — Leslie Wong

(57) ABSTRACT

The present invention discloses a loading unit which loads the target web site after receiving a URL of a target web site; an action design unit which makes the user arbitrarily plan and arbitrarily set pre-determined work to extract target data from the target web site; an executing unit which consistently arranges the pre-determined work arbitrarily planned through the action design unit, and performs a designated event; an importing unit which extracts target data through the event work and presents them to a user.

7 Claims, 6 Drawing Sheets

(56) References Cited

U.S. PATENT DOCUMENTS

| | | | | |
|---|---|---|---|---|
| 2016/0314301 A1* | 10/2016 | Johns | ............... | G06F 21/577 |
| 2019/0303779 A1* | 10/2019 | Van Briggle | ........... | G06F 9/485 |
| 2020/0159499 A1* | 5/2020 | Bodin | ................ | G06F 3/1454 |
| 2022/0092028 A1* | 3/2022 | Layton | ............... | G06F 16/164 |
| 2022/0414163 A1* | 12/2022 | Kim | ..................... | G06F 16/955 |
| 2023/0088595 A1* | 3/2023 | Asanuma | ........... | G06Q 30/0201 |
| | | | | 705/7.23 |

FOREIGN PATENT DOCUMENTS

| | | | | | |
|---|---|---|---|---|---|
| CN | 110929128 A | * | 3/2020 | | |
| KR | 20150085716 A | * | 7/2015 | | |
| TW | 201305834 A | * | 2/2013 | ........... | G06F 16/951 |

\* cited by examiner

[Fig. 1]
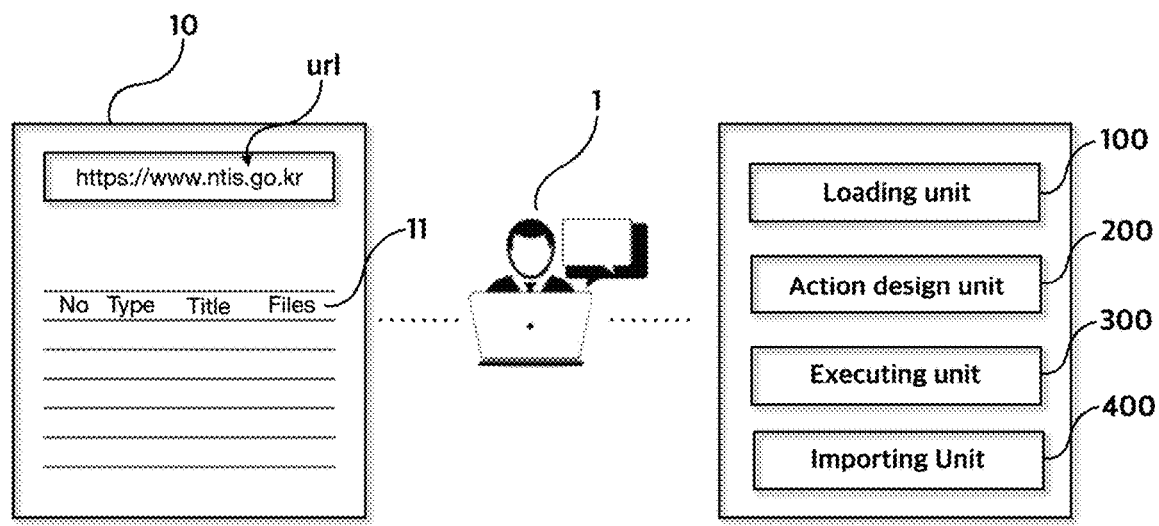
[Fig. 2]

[Fig. 3]
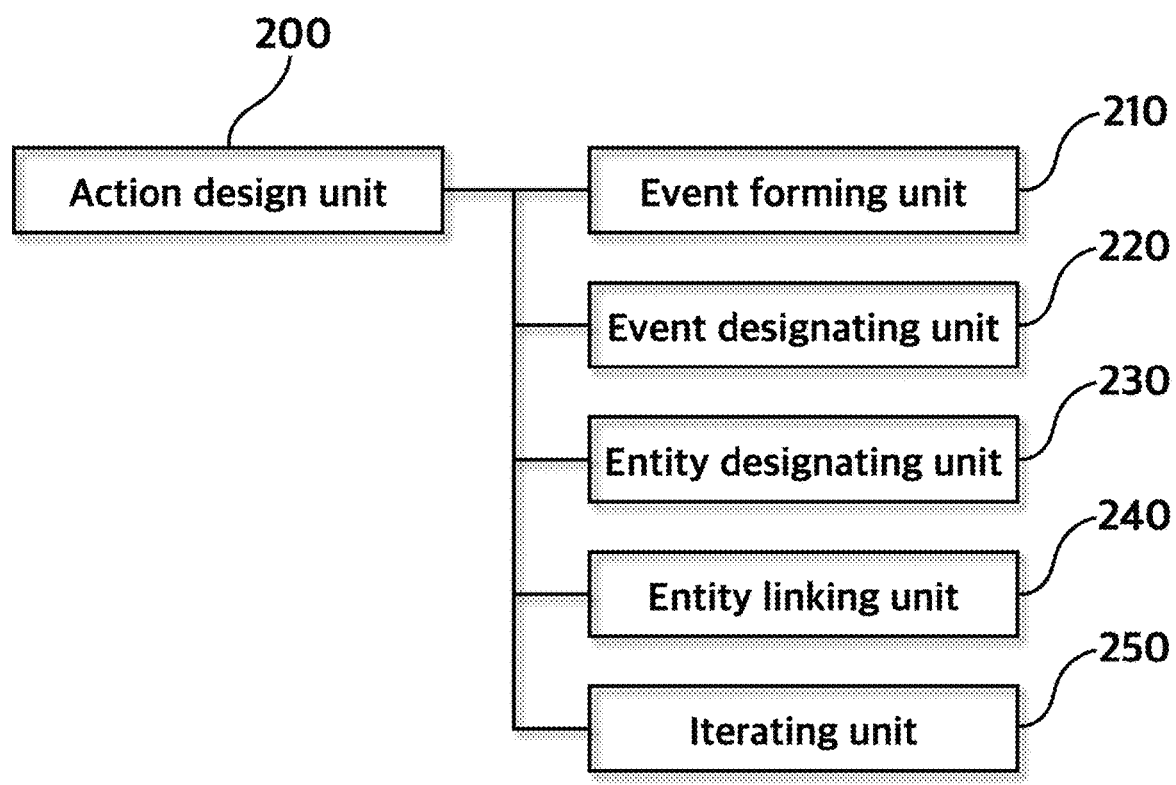

[Fig. 4]
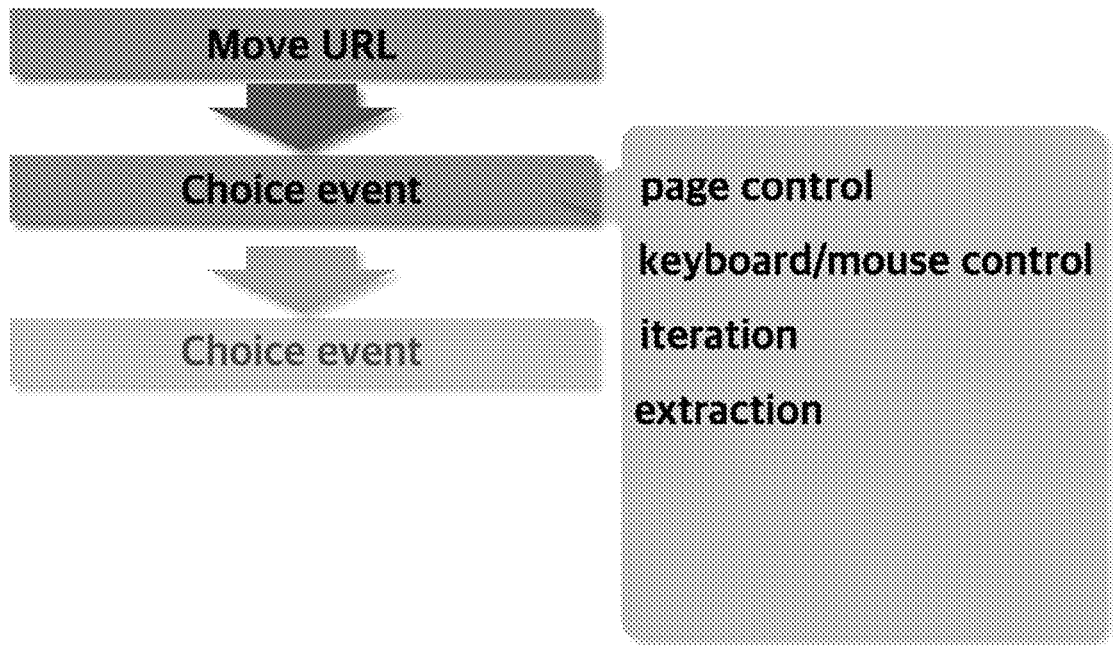
[Fig. 5]
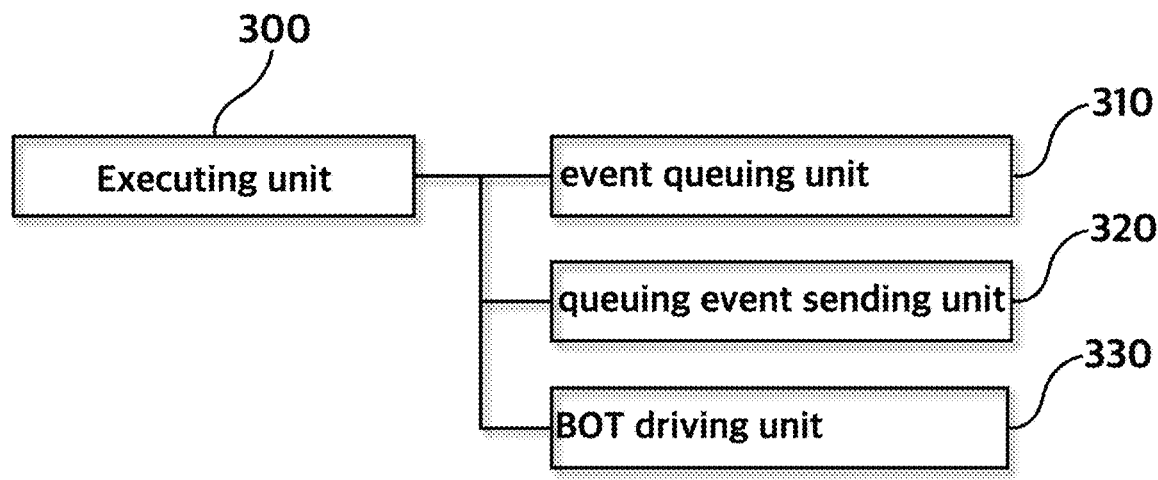

[Fig. 6]

[Fig. 7]
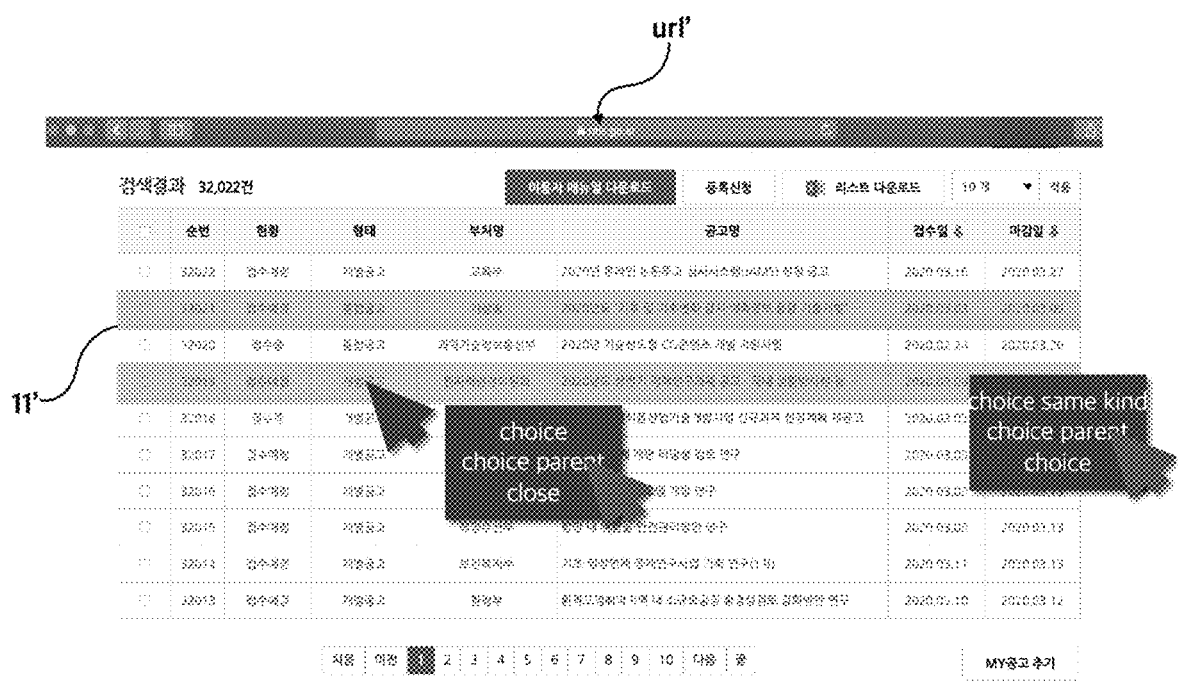

[Fig. 8]
[Fig. 9]
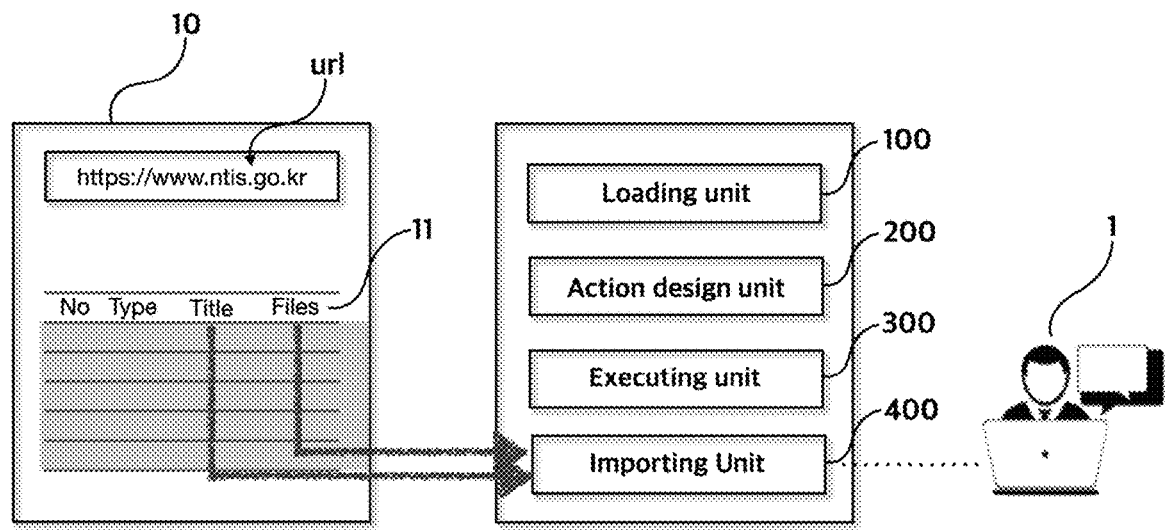

SYSTEM FOR SELECTIVELY IMPORTING WEB DATA BY ARBITRARILY SETTING ACTION DESIGN

TECHNICAL FIELD

The present invention is related to a system for importing web data, more specifically, the system allows event's scenario arbitrarily to set in order to extract web data and web data operated by other external servers selectively to import.

BACKGROUND ART

Since the introduction of the internet, an oil field of the digital age, so-called big data has provided the public through web called window.

It is expected that according to the statistics of Dell EMC, well-known large information management system, data will annually increase up to 35 zetabyte in 2020, which used to be 6.2 exabyte in 2000. Zetabyte is 1000 times of exabyte, and for 20 years, more than 5000 times of data will increase. The increased data of 94 percentage consist of digital forms. This means most of newly created data are born as digital forms. Information of all the digitalized data does not exist in the web, but the use of web data helps gather information and make decision, which cannot be denied, because most digital data are shared in the web.

Many technical attempts for collecting web data obtain and the prior arts have been displayed.

For example, there is "SETUP METHOD FOR WEB SCRAPPING EXTRACTED DATA" (Korean Patent No. 10-1569984, the prior art 1).

The prior art 1 relates to a setup method for web scrapping extracted data, which comprises the following: a step of program operation that operates the GUI based web scrapping setup program that outputs an action element list window, a scenario board window showing action elements selected by a user, and an action element attribute input window that outputs and selects the attribute for a web browser, and the web browser; a step of action element selection where a user presses the action element button in the action element list window to register in the scenario board window; step of scenario preparation where a user selects and inputs the data and attribute displayed on the current page of the web browser by using the action element registered in the scenario board window in the step of element selection and then prepares a scenario for data extraction; and a step of setup saving where a user saves the data extracted in the step of data extraction and the scenario setup data as a file. Using the scenario setup file saved in the step of setup saving, the web scrapping main program's data extraction setup is added, deleted or changed. According to the present invention, the web scrapping or web automation related main program's data extraction setup can be easily changed or configured on the GUI by using the attribute addition method.

Also, there is "SYSTEM FOR EXTRACTING WEB DATA IN THE MOBILE ENVIRONMENT WHERE A DATA REQUEST AND AN EXTRACTION PROCESS ARE DEFINED WITH A WEDL DOCUMENT, AND WHERE WEB DATA IS EXTRACTED BY THE DEFINED PROCESS(Korean Patent No. 10-1231329, the prior art 2)."

The prior art 2 relates to system for extracting web data in the mobile environment. A web server access method and a web data extraction method are described on a WEDL (Web Extraction Definition Language) document. Based on the WEDL document, a WEDL library is directly connected to a web server. The WEDL library extracts data from a webpage received from the web server.

In addition, there is "DEVICE AND METHOD FOR COLLECTING WEB DATA(Korean Patent No. 10-1913780, the prior art 3)."

The prior art 3 is about a web data scraping system and an operating method thereof. The system simulates a target site specified by a user and renders the target site in a separate frame, so that a site which does not conform to a web standard can also be accurately simulated through a proxy setting. The user can intuitively and easily select a document object model (DOM) from the corresponding frame, and can generate an event controlling the DOM as a data collection rule. Therefore, the event is reflected on a scenario, thereby providing a web scraping service such as automatic repetition performing.

Likewise, there is "SYSTEM AND METHOD FOR PRODUCING SCENARIO FOR WEB INFORMATION COLLECTION(Korean Patent No. 10-1884207, the prior art 4)."

The prior art 4 is about a system and a method for producing a scenario. According to an embodiment of the present invention, the scenario manufacturing system comprises: a terminal part capable of generating or changing a scenario which collects data; and a server searching the data according to the scenario.

The disclosed arts existing have problems that the existing arts are mostly about technical contents for experts and users with some specific knowledge of web editing on target web site can use effectively (the art).

Additionally, there is another problem that not only a variety of several accesses for extracting web data from other web sites cannot provide intuitively, but also the prior arts discloses difficult technical ideas which make general users acquire unnecessary knowledge.

SUMMARY OF INVENTION

According to the present invention, system for selectively importing web data by arbitrarily setting action design originated to solve the previous problems as follows.

First, the present invention is to provide system to extract proposed web data by a general user with basic knowledge (beginner).

Second, the present invention is to render a user arbitrarily and automatically form an event to perform in order to extract web data.

Third, through a user's arbitrary setting, the present invention is to render purposed data to be extracted consistently.

The object of the present invention is not limited by the features described above, and other unmentioned tasks to solve should be clearly understood by the skilled artisan with the details below.

According to the present invention, system for selectively importing web data by arbitrarily setting action design have solutions for the tasks to solve as follows.

According to the present invention, system for selectively importing web data by arbitrarily setting action design comprises a loading unit which loads the target web site after receiving URL(uniform resource locator) of a target web site; an action design unit which makes the user arbitrarily plan pre-determined work to extract target data from the target web site, and makes the pre-determined work arbitrarily designate through the imaging site; an executing unit which (consistently) arranges the pre-determined work arbitrarily planned through the action design unit, and performs (the) designated event in the action design unit; the importing unit which extracts target data from the target web site through the event work performed by the executing unit and presents them to the user.

According to the present invention, the loading unit replicates the target web site and presents the imaging site of the target web site directly in the user's terminal.

According to the present invention, the action design unit comprises an event formation unit which arbitrarily creates an event for the pre-determined work by the user; and an event designating unit which renders the user arbitrarily designate event items for the event events arbitrarily created by the user.

According to the present invention, the action design unit comprises an object designating unit which makes the event items arbitrarily designated by the event designating unit designated on an object of the imaging site and further comprises an object linking unit which gives a mutual connection of objects of the imaging site designated on the object designating unit and makes the object(s?) selectively designated according to the connection.

According to the present invention, the action design unit further comprises an iterating unit which redesignates the event item(s) designated by the event designating unit according to the user's arbitrary designating pattern(s).

According to the present invention, the iterating unit sets the arbitrary setting pattern(s) on the basis of the event item's redesignating numbers and the event item(s)' redesignating moment.

According to the present invention, the executing unit comprises an event queeing unit which arranges the event's item(s) and forms an event queeing signal on the basis of the user's arbitrary setting pattern(s).

According to the present invention, the executing unit further comprises an queeing event sending unit which sends the queeing signal formed by the event queeing unit to an external BOT.

According to the present invention, the executing unit comprises a BOT driving unit which performs the pre-determined work arbitrarily planned through the BOT after the queeing signal formed(created) by the event queeing unit gets successively assigned.

According to the present invention, the importing unit extracts (the) target data acquired from the pre-determined work performed by the BOT driving unit and presents them in the user's terminal.

According to the present invention, system for selectively importing web data by arbitrarily setting action design provides effects as follows.

First, a purpose of the present invention is to allow user's purposed work automatically to perform and a user to obtain target data from a target web site according to his/her wish.

Second, another purpose of the present invention is to break away the old acquisition method of quantity-centered web data and provide an effect to cut down an excessive cost of the old method.

Third, a user makes his/her actual purposed work automatically perform through a series of visualized flow charts and the purposed work automatically and computationally done according to his/her wish.

The effect of the present invention is not limited thereto, and other effects unmentioned will be apparently considered by the skilled artisan as follows.

BRIEF OF DESCRIPTION OF DRAWINGS

FIG. 1 is a conceptual diagram of system for selectively importing web data by arbitrarily setting action design according to an embodiment of the present invention.

FIG. 2 is an example frame illustrating that a loading unit directly loads other web sites exactly the same, according to an embodiment of the present invention.

FIG. 3 is a block diagram illustrating an action design unit and the substructure according to an embodiment of the present invention.

FIG. 4 is an example frame displaying a control box for setting an event according to an embodiment of the present invention.

FIG. 5 is a block diagram illustrating an executing unit and the substructure according to an embodiment of the present invention.

FIG. 6 is an example frame for entity setting and entity linking in a loaded target frame according to an embodiment of the present invention.

FIG. 7 is an example frame for entity setting and entity linking in a loaded target frame according to an embodiment of the present invention.

FIG. 8 is an example frame illustrating an automatic entity setting based on entity linking according to an embodiment of the present invention.

FIG. 9 is a conceptual diagram illustrating an importing unit in accordance with an embodiment of the present invention, which imports purposed data from a target web.

DETAILED DESCRIPTION OF THE INVENTION

FIG. 1 is a conceptual diagram of system for selectively importing web data by arbitrarily setting action design according to an embodiment of the present invention.

FIG. 2 is an example frame illustrating that a loading unit directly loads other web sites exactly the same, according to an embodiment of the present invention.

FIG. 3 is a block diagram illustrating an action design unit and the substructure according to an embodiment of the present invention.

FIG. 4 is an example frame displaying a control box for setting an event according to an embodiment of the present invention.

FIG. 5 is a block diagram illustrating an executing unit and the substructure according to an embodiment of the present invention.

FIG. 6 is an example frame for entity setting and entity linking in a loaded target frame according to an embodiment of the present invention.

FIG. 7 is an example frame for entity setting and entity linking in a loaded target frame according to an embodiment of the present invention.

FIG. 8 is an example frame illustrating an automatic entity setting based on entity linking according to an embodiment of the present invention.

FIG. 9 is a conceptual diagram illustrating an importing unit in accordance with an embodiment of the present invention, which imports purposed data from a target web. The term "unit" used in FIGS. 1, 3-5, and 9 as well as herein refers to a component such as a processor with or without a memory for selectively importing data from a user-designated target website. The term "unit" is, for example, configured with one or more devices, circuits, and/or processing cores to process data, such as computer program instructions.

As shown in FIG. 1, the present invention's purpose is that the user 1 collects purposed target data 11 from a target web site 10. In order to extract the purposed target data 11, it conducts in the way of copying a URL(Uniform Resource Locator) of the target web site 10 and pasting it on a loading unit 100, and then a repetitive action of the user 1 to perform is implemented through action design unit 200.

As to the target data 11, it means object data provided in a web site or a web page, which the user tries to obtain. Therefore, there is no limit of types of the target data 11 and all the data obtained by a purpose of the user 1 can be the target data. FIG. 1 and FIG. is embodied as examples in order to help understanding the target data 11 and the target data 11 may be a title of a post, article contents, an attached pile(a document file, an executable file, an image file, a video file or other definable files) in a web page.

As shown in FIG. 1, the present invention comprises a loading unit 100, an action design unit 200, an executing unit 300, and an importing unit 400.

First, the user 1 connects the web site to collect purposed target data 11 with his/her terminal and opens a web page containing the web data to extract.

The user 1 copies a URL of a web page presenting the target data 11 to obtain and pastes it on a loading unit which is a component of the present invention, and the loading unit 100 receives the URL of the target web site and loads the target web site.

More specifically, as shown in FIG. 2, the loading unit 100 replicates the target web site 10 and presents the imaging site 11 of the target web site 10 in the user's terminal.

Afterward, the action design unit 200 provides UI(User Interface) so that the user arbitrarily plans the pre-determined work to extract the target data 11 from the target web site 10, and through UI the user 1 arbitrarily sets the pre-determined work which forms a flow chart as purposed.

During this process, the user 1 arbitrarily designates what the purposed target data 11 of the pre-determined work is in the imaging site 10 as described above and the pre-determined work on the designated object is automatically performed and as a result, the user 1 obtains the target data 11.

As explained above, once the pre-determined work is planned by the user 1, the executing unit 300 actually performs the pre-determined work.

In other words, the executing unit 300 consistently arranges the pre-determined work arbitrarily planned by the action design unit 200 and performs the designated event in the action design unit 200.

Specifically, the executing unit 300 accesses a web site of a loaded URL and extracts the target data 11 which the corresponding web site provides, and the corresponding data extracted by the importing unit 400 is saved in a sub site. The sub site requests to save the corresponding target web site 10 to the transferred site by a sub site of the web site possessed by the present system.

As described above, the importing unit 400 extracts and obtains the purposed target data 11 performed by the executing unit 300, and the importing unit provides the user 1 with the purposed target data 11 in a consistently arranged form.

As shown in FIG. 3, the action design unit comprises an event forming unit 210 and an event designating unit 220.

First, as shown in FIG. 4, an event forming unit 210 renders the user 1 create his/her own execution column, called "event choice" at his/her wish.

The event forming unit 210 renders an arbitrary event of the user 1, an execution column for a certain computational event's executing be newly opened, which makes an arbitrary computational work newly perform or extinct.

The event designating unit 220 renders the user 1 designate specific items opened and created by the event forming unit 210.

As shown in FIG. 4, after "an event choice," a new event window is opened, the event designating unit 220 presents specific items such as "page control," "keyboard/mouse control," "repetition," or "extraction," etc. to a user and additionally sub items of these to him/her. Through the choice and designation of the corresponding items, the user 1 may choose what kinds of specific events opened events will perform, and a multitude of this opened and designated events are a series of pre-determined work arbitrarily planned by the user 1 as explained above.

As shown in FIG. 3, the action design unit 200 further comprises an entity designating unit 230 and an entity linking unit 240.

As shown in FIG. 2, the entity designating unit 230 renders a specific entity designate in order to perform opened and designated event by the user 1 from the imaging site replicating the target web site 1 as described above.

For instance, as shown in FIG. 6, when the user 1 clicks on a title of a certain post in the imaging site, he/she may choose whether he/she decides "choice" or not on the post, and the selected post makes the created and designated event perform on the designated entity as explained above. In other words, the creation and designation of an event follows the entity according to designation of an entity.

The entity linking unit 240 grants the correlation of entities on the imaging site designated by the entity designating unit 230 and makes the entity selectively and automatically designated according to the correlation.

Namely, as shown in FIG. 6, the entity designating unit 230 performs a function so that the user 1 designates an entity, and as shown in FIG. 7, work to grant connectivity to unite the same element is implemented and all the posts with the same connectivity may be automatically selected.

In addition, the action design 200, as shown in FIG. 3, further comprises an iterating unit 250.

The iterating unit 250 redesignates an event item designated by the event designating unit 220 according to the arbitrary setting pattern of the user 1.

The iterating unit 250 has a function that the event items designated and planned by the user 1 on the designated entities can be redesignated and redone as much as he/she wants. In other words, the iterating unit 250 sets the arbitrary setting patterns on the basis of the redesignating number and time of the event items.

As shown in FIG. 8, if there are designated entities, a user can arbitrarily set an events' automatic execution on the entities multiple times and the arbitrary setting on cycle of the number and time of the repetitive execution and the resumption of the event is available. The process makes the executing unit 300 automatically execute without visiting or monitoring the corresponding web site for user's purposed target data obtaining.

As shown in FIG. 5, the executing unit 300 comprises an event queeing unit 310.

On the basis of the various formed events as shown in FIG. 4 and on the basis of a user's arbitrary setting pattern after arranging events' items, the event queeing unit 310 arranges event items and creates an event queeing signal.

Besides, an executing unit 300 further comprises a queeing event sending unit 320.

The queeing event sending unit 320 sends a queeing signal created by the event queeing unit 310 to external BOT.

As described above, in order to execute successively a queeing signal on a pre-determined work arbitrarily planned by the action design unit 200 and the user 1, the executing unit 300 sends a series of the sequences to BOT to perform a pre-determined work.

Furthermore, the executing unit 300 further comprises a BOT driving unit 330.

The BOT driving unit 330 is system for selectively importing web data by arbitrarily setting action design that comprises a BOT driving unit which executes the pre-determined work arbitrarily planned through BOT with receiving a queeing signal successively assigned. The queeing signal is created by the event queeing unit 310.

The BOT is an application software that executes automated work, which is a script, on the internet. The BOT refers to an application software that computationally and automatically executes a pre-determined work to apply an actual work for the user 1's actual execution.

The BOT such as web crawler of search engine has a function to read automatically and save target data, purposed contents of a target web site through the BOT.

Afterwards, as shown in FIG. 9, an importing unit 400, as described above, presents extracted and obtained target data to the terminal of the user 1. During the process, the importing unit 400 provides a user centered interface for target data which the user 1 wants to obtain, and presents the target data.

The scope of the present disclosure should be determined by listed items, and the brackets of claims are listed not for optional limit but for clear elements, and contents of brackets should be understood as essential elements.

The invention claimed is:

1. A system for selectively importing web data by arbitrarily setting action design comprising: one or more processors configured to:
   load a target web site after receiving a URL of the target web site;
   allow a user to configure an event-driven work flow, to extract the target data from the target web site said event-driven work flow for applying to the target website through an imaging site; and
   extract the target data from the target web site and present the extracted target data to the user, wherein
   the one or more processors are further configured to:
   replicate the target web site and display the imaging site of the target website to the user's terminal, allowing the user to specify how the event the user defined is to be performed to the target website;
   allow the user to select one or more objects within the target website on the imaging site; and,
   analyze a relationship between the user selected objects and automatically select other objects within the target website based on the relationship between the user selected objects.

2. The system according to the claim 1, wherein the one or more processors are further configured to reset items pertinent to the event to define how the event is to be performed according to the user's settings.

3. The system according to the claim 2, wherein the or more processors are further configured to allow the user to reset the items based on a number of the resets and when the reset is made.

4. The system according to the claim 2, wherein the one or more processors are further to arranges the event's item and forms an event queueing signal on the basis of the user's settings.

5. The system according to the claim 4, wherein the one or more processors are further to send the event queueing signal to an external BOT.

6. The system according to the claim 5, wherein the one or more processors are further to performs a pre-determined work after receiving the queueing signal assigned.

7. The system according to the claim 6, wherein the tone or more processors are further to extracts target data acquired from the pre-determined work and present the extracted target data in the user's terminal.

\* \* \* \* \*